United States Patent [19]

Bloch et al.

[11] Patent Number: 4,806,086
[45] Date of Patent: Feb. 21, 1989

[54] EXTRUDER HEAD WITH A ROTARY DIE AND PROCESS FOR LUBRICATING THIS HEAD

[75] Inventors: Peter Bloch, Montcherand; Robert Aste, Yverdon, both of Switzerland

[73] Assignee: Swisscab E.A. Schoen S.A., Yvonand, Switzerland

[21] Appl. No.: 44,036

[22] PCT Filed: Jun. 16, 1986

[86] PCT No.: PCT/CH86/00088
§ 371 Date: Feb. 13, 1987
§ 102(e) Date: Feb. 13, 1987

[87] PCT Pub. No.: WO86/07562
PCT Pub. Date: Dec. 31, 1986

[30] Foreign Application Priority Data

Jun. 17, 1985 [FR] France ................................ 85 09290

[51] Int. Cl.$^4$ .............................................. A23G 1/20
[52] U.S. Cl. ..................................... 425/114; 425/461
[58] Field of Search ..................... 425/113, 114, 961; 264/1.5, 167, 174

[56] References Cited

U.S. PATENT DOCUMENTS

| | | | |
|---|---|---|---|
| 2,779,970 | 2/1957 | Stocker | 18/13 |
| 2,943,351 | 7/1960 | Gray | 425/113 |
| 3,059,277 | 10/1962 | Pierce | 18/14 |
| 3,613,162 | 10/1971 | Talsma | 18/14 |
| 4,548,567 | 10/1985 | Missout | 425/113 |
| 4,623,495 | 11/1986 | Degoix et al. | 264/1.5 |

FOREIGN PATENT DOCUMENTS

| | | |
|---|---|---|
| 712018 | 10/1941 | Fed. Rep. of Germany . |
| 2559613 | 4/1985 | France . |
| 258422 | 11/1948 | Switzerland . |

Primary Examiner—Bernard Nozick
Attorney, Agent, or Firm—Frost & Jacobs

[57] ABSTRACT

The present invention relates to an extruder head with a rotary die which requires no ball or roller bearings. A die and a mandrel rod consisting of a cable guide are fixed in a cylindrical axial bore of an intermediate rotary sleeve driven by a driving mechanism. The sleeve has a substantially cylindrical outer surface which slidingly revolves in the axial bore of a distributing cartridge. The gliding surfaces are lubrified by the hot synthetic material. A clamping nut axially maintains the intermediate sleeve and allows the leakage flow of the synthetic material to be controlled. Such an extruder head may be utilized for the fabrication of helicoidal elements of synthetic material, especially helicoidal rods for optical fibers.

7 Claims, 1 Drawing Sheet

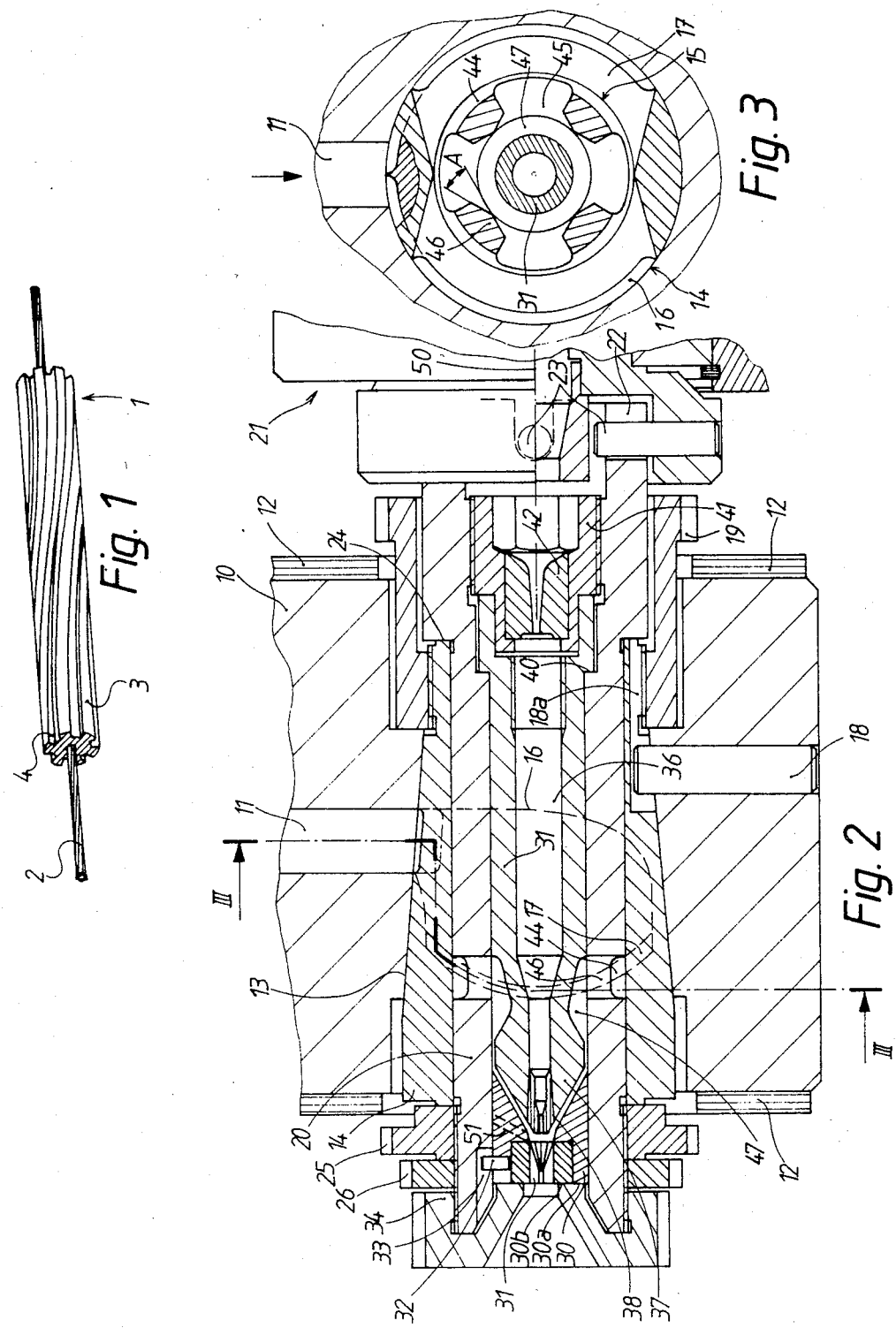

EXTRUDER HEAD WITH A ROTARY DIE AND PROCESS FOR LUBRICATING THIS HEAD

BACKGROUND OF THE INVENTION

The present invention relates to an extruder head for fabricating a helicoidal element of synthetic material, comprising a rotary die provided with an axial orifice whose form corresponds to the transverse profile of the element to be fabricated, a mandrel rod aligned with the die, an intermediate rotary sleeve, which is coupled to a rotary driving mechanism and inside which the die and the mandrel rod are centrally fixed, this sleeve being provided with channels for passage of the synthetic material and a distributing cartridge fixedly mounted and provided with an axial bore, in which the intermediate sleeve is accomodated, and with distribution channels for distributing the synthetic material on the periphery of this sleeve.

According to another aspect, the invention also relates to an extruder head for fabricating an element of synthetic material of a first color having at least one helicoidal band of synthetic material of a second color, this head comprising a rotary die provided with an axial orifice, whose form corresponds to the transverse profile of the element and with at least one transversal feed channel for the material of the second color, a mandrel rod aligned with the die, an intermediate rotary sleeve, which is coupled to a rotary driving mechanism and inside which the die and the mandrel rod are centrally fixed, this sleeve being provided with cross-channels for passage of the synthetic material and a distributing cartridge fixedly mounted and provided with an axial bore, in which the intermediate sleeve is accomodated, and with distribution channels for distributing the synthetic material on the periphery of the sleeve.

The invention also relates to a process for lubricating an extruder head with a rotary die.

Extruder heads wtih a rotary die are utilized to produce elements whose outer surface has a helicoidal form, especially sheaths formed on the central conductor of a coaxial cable and provided with a helicoidal cheek serving to center this conductor with respect to the outer conductor, or cylindrical rods with helicoidal grooves serving as a support for optical fibers, in an optical cable. The extruder heads wtih a rotary die which are currently known present several problems which can only be solved by complicated and costly means. As the synthetic material delivered under pressure by the extruder reaches the die through a conical channel defined on one side by a fixed mandrel rod, and on the other by the rotary die, the die is subjected to a very strong axial thrust, which must be taken up by a thrust ball or roller bearing which is costly and bulky. The European patent application published under No. 0078 213 illustrates an example of such an arrangement.

On the other hand, it is difficult to obtain proper tightness between the rotary die and its fixed support in the extruder head, so as to avoid that leaks of synthetic materials foul up the ball bearing or bearings. It is generally necessary to provide labyrinth joints, which are costly and delicate.

Lastly, the presence of these joints and the ball or roller bearings makes heating of the die more difficult, particularly heat transmission by conduction.

For covering a wire by means of two insulating materials of different colors forming helicoidal bands, the patent CH-A-258422 provides a rotary wire guide on which the die is screwed and which encloses channels for distributing synthetic materials from two annular grooves provided on its peripheral surface. The wire guide revolves in an axial bore of a distributing cartridge which is fixed. This system absolutely does not permit precise centering of the die with respect to the wire guide. In addition, the structure of the wire guide, with the distribution channels and the driving mechanism which it comprises is extremely complicated and delicate. Lastly, nothing is provided to resolve the problems of tightness between the mandrel rod and the distributing cartridge.

The U.S. Pat. No. 2,779,790 also provides for a head for extruding a two-tone element having helicoidal bands. The structure described in this document is of the type indicated in the preamble. The sliding and bearing surface of the intermediate rotary sleeve on the fixed distributing cartridge is conical, the sleeve being pressed axially against the cartridge by means of a spring which bears upon the rotary driving mechanism of the sleeve. In addition to the axial forces exerted on the body of the head and on the driving mechanism due to the thrust of the spring, this structure is unfavorable with regard to tightness along the sliding surface because the pressure of the material at this conical surface must be balanced by the thrust of the spring. Now, this pressure may be very high (up to 700 bars or more) and it may vary substantially in the course of a given fabrication.

SUMMARY OF THE INVENTION

The present invention consequently has the object of providing an extruder head with a rotary die which has a simple and compact structure and which allows the drawbacks mentioned above to be substantially remedied, and in particular to avoid the utilization of ball or roller bearings, while allowing proper lubrication to be obtained.

To this end, the invention relates to an extruder head of the first type mentioned in the preamble, characterized in that the intermediate sleeve comprises an outer cylindrical surface adapted to slidingly revolve within the axial cylindrical bore of the distributing cartridge, a peripheral shoulder adapted to be applied to one extremity of this cartridge, and an adjusting nut for exerting an adjustable thrust upon the other extremity of said cartridge.

According to the invention there is provided an extruder head for fabricating a helicoidal element of synthetic material, comprising a rotary die provided with an axial orifice the form of which corresponds to the transverse profile of the element to be fabricated, a mandrel rod aligned with the die, an intermediate rotary sleeve which is coupled to a rotary driving mechanism and inside which the die and the mandrel rod are centrally fixed, the intermediate sleeve being provided with channels for passage of the synthetic material, and a distributing cartridge fixedly mounted and provided with an axial bore in which the intermediate sleeve is accommodated, and with distributing channels for distributing the synthetic material on the periphery of the sleeve, wherein the intermediate sleeve comprises an outer cylindrical surface adapted to revolve slidably within the axial cylindrical bore of the distributing cartridge, a peripheral shoulder adapted to be applied to one extremity of the cartridge, and an adjusting nut for exerting an adjustable thrust on the other extremity of the cartridge.

The invention further provides an extruder head for fabricating an element of synthetic material of a first color having at least one helicoidal band of synthetic material of a second color, the extruder head comprising a rotary die provided with an axial orifice, the form of which corresponds to the transverse profile of the element, and with at least one transverse channel for feeding the material of the second color, a mandrel rod aligned with the die, an intermediate rotary sleeve which is coupled to a rotary driving mechanism and inside which the die and the mandrel rod are centrally fixed, the intermediate sleeve being provided with cross-channels for passage of the synthetic material, and a distributing cartridge fixedly mounted and provided wtih an axial bore in which the intermediate sleeve is accommodated, and with respective distribution channels for distributing the first color and the second color synthetic materials on the periphery of the sleeve, wherein the intermediate sleeve comprises an outer cylindrical surface adapted to revolve slidably within the axial cylindrical bore of the distributing cartridge, a peripheral shoulder adapted to be applied to one extremity of the cartridge, and an adjusting nut for exerting an axial thrust in the other direction.

The intermediate sleeve preferably comprises, facing the distribution channel of the cartridge, a peripheral groove which communicates with the interior of the sleeve through cross-channels for passage of the synthetic material. These cross-channels are separated from each other by tie pieces having faces situated facing the mandrel rod which form, in transverse profile, acute angles with the peripheral surface of the mandrel rod, and the mandrel rod comprises a peripheral groove facing said cross-channels.

According to an advantageous embodiment, the rotary driving mechanism is disposed facing the rear extremity of the intermediate sleeve, that is, on the side opposed to the exit of the extruded product, and comprises radial pins which are engaged in notches provided in the rear extremity of said sleeve.

The die is preferably mounted slidably in the intermediate sleeve, in an axial position which is adjustable by means of an abutment nut screwed to the intermediate sleeve. This die may comprise an outer cylindrical surface, and a rotary driving pin which is engaged in a corresponding longitudinal groove of the intermediate sleeve.

According to a particular embodiment, the mandrel rod comprises a cylindrical outer surface for centering in the intermediate sleeve, and a circular abutment shoulder, a rear locking nut being mounted in the intermediate sleeve in the extension of the mandrel rod extremity which is opposed to the die, in such a manner as to lock the mandrel rod axially and in rotation by clamping of this shoulder.

Thanks to the utilisation of an intermediate sleeve comprising an essentially cylindrical peripheral surface and to the distribution of the synthetic material under pressure, all around this sleeve, the resultant of the forces exerted on the intermediate sleeve has no significant axial or radial component, which allows to avoid the utilization of ball or roller bearings as well as the necessity of an axial stop subjected to a significant thrust. Thus, the sleeve may simply revolve while sliding within the central hole of the cartridge.

According to another aspect, the present invention also relates to an extruder head of the second type mentioned in the preamble, characterized in that the intermediate sleeve comprises an outer cylindrical surface adapted to slidingly revolve within the axial cylindrical bore of the distributing cartridge, a peripheral shoulder adapted to be applied to one extremety of this cartridge, and an adjusting nut for exerting an adjustable thrust upon the other extremity of said cartridge.

The present invention hence also has as an object a process for lubricating an extruder head with a rotary die for extruding elements of thermoplastic synthetic material, said die being fixed in an intermediate rotary sleeve including an outer surface of revolution for slidingly revolving in an axial bore of a distributing cartridge fixedly mounted in the extruder head, said cartridge being provided with distribution channels for distributing the synthetic material under pressure on the periphery of the rotary die in a central portion of said surface of revolution and for thus feeding the die by means of channels provided through the rotary die, characterized in that a leakage flow of the thermoplastic material is permitted along said surface of revolution for lubricating said surface, and in that this leakage flow is controlled by axial clamping of two annular elements mounted on the intermediate rotary sleeve and slidingly applied to the respective extremities of the distributing cartridge, the leakage flow escaping between said annular elements and the extremities of the cartridge.

According to a preferred embodiment, said surface of revolution is made with a cylindrical form having one extremity which comprises an outer shoulder applied to one extremity of the distributing cartridge, due to the clamping effect of a nut screwed to the intermediate rotary sleeve and applied to the other extremity of said cartridge, and the leakage flow is adjusted by rotating the nut on the sleeve.

BRIEF DESCRIPTION OF THE DRAWINGS

The invention may be better understood by means of the description of a preferred embodiment, given below with reference to the accompanying drawings, wherein:

FIG. 1 is a perspective view of a rod section with helicoidal grooves for optical fibers, fabricated by means of an extruder head with a rotary die, FIG. 2 is a partial axial sectional view of an extruder head with a rotary die according to the invention, and FIG. 3 is a cross-sectional view along the line III—III of FIG. 2.

DETAILED DESCRIPTION

With reference to FIG. 1, the element to be fabricated in the example described below is a grooved rod 1 for optical fibers, comprising a central traction element consisting of a small metallic cable 2, and a sheath 3 of thermoplastic synthetic material which is extruded on to the cable 2 and which has a generally cylindrical form. A set of helicoidal grooves 4 is formed on the outer surface of the sheath 3 at the instant of its extrusion. These grooves are each intended to receive one or several optical fibers and they may have a profile of any form, appropriate for their function. Grooved rods of this type are currently fabricated by means of known extruder heads with a rotary die.

With reference to FIGS. 2 and 3, the extruder head according to the invention comprises a metallic body 10 of known design, of the type utilized in extruder heads with a non-rotating die. The body 10 is provided with a feed channel 11 for the heated synthetic material, delivered under pressure by an extruder, and a heating device which here consists in a known manner of electric heating elements applied to the outer faces of the body 10. The feed channel 11 opens laterally into a conical bore 13 in which a distributing cartridge 14 provided with an axial cylindrical bore 15 is fixed. This cartridge is provided with two distribution channels 16 in two lobes which extend symmetrically on both sides of the cartridge from the feed channel 11 and which pass through the cartridge to open into its axial bore via slits 17 each extending over 180° on the circumference of the bore 15. A finger 18 mounted in the body 10 and engaged in an axial groove 18a of the cartridge 14 prevents any rotation of this cartridge, which is axially retained by a nut 19.

An intermediate tubular sleeve 20, having an outer cylindrical surface over a large portion of its length, is inserted in the axial bore 15 of the distributing cartridge 14. Its outer diameter is inferior by a few hundredths of a millimeter to that of the bore 15, so that it may slidingly revolve in this bore. To this end, the intermediate sleeve 20 is rotatably driven by a driving mechanism 21 coupled to the rear portion of the sleeve, that is, its right hand portion in FIG. 2. In order to allow an axial, radial or angular clearance, the coupling mechanism comprises four longitudinal notches 22, disposed symmetrically at the rear extremity of the sleeve 20, and four radial pins 23 fixed to the driving mechanism 21 and respectively engaged in the notches 22. The pins 23 may be easily disengaged from the notches 22 by an axial return movement of the mechanism 21.

To be axially positioned with respect to the cartridge 4, the intermediate sleeve 20 includes on its rear portion a circular peripheral shoulder 24 adapted to bear upon the rear extremity of the cartridge 14, and an adjusting nut 25 which, when tightened, is applied to the other extremity of the cartridge 14. A counter-nut 26 is provided to lock the nut 25. In this manner, one may adjust the axial tightening force of the cartridge 14 on the intermediate sleeve 20.

The intermediate sleeve 20 is provided with an axial bore of generally cylindrical form, inside which are mounted in alignment with each other a die 30 and a cable guide 31 which are both rotatable with the sleeve 20. The axial bore of the sleeve 20 ensures fixed centering of the die and the cable guide. In the present case, the die 30 consists of two elements fixed together, namely an outer body 30a of stainless steel and a ring 30b having a high resistance to wear, made for example of a metallic carbide. The die 30 presents an inner surface of known form which comprises a conical portion on the body 30a and an axial orifice 31 in the ring 30b. The orifice 31 is provided with a series of helicoidal ribs adapted to shape the grooves 4 of the fabricated element 1. To be rotatably driven with the intermediate sleeve 20, the die 30 is provided with a radial pin 32 which is engaged in a longitudinal groove 33 of the sleeve. The die is axially maintained by bearing upon an abutment nut 34, screwed to the front extremity of the sleeve 20. This nut transmits to the sleeve the axial thrust resulting from the pressure of the synthetic material upon the die 30. It also permits adjusting the axial position of the die, to optimize the flow of the synthetic material.

The cable guide 31 has a generally tubular form, with an axial channel 36 for passage of the cable 2. In the front portion 37 of the cable guide, this channel encloses a ring 38 for supporting the cable, made of a material having a high resistance to wear. The portion 37 of the cable guide has a generally conical form and it serves as a mandrel rod within the conical recess of the die 30. At its rear extremity, the cable guide 31 is provided with a peripheral shoulder 40 which abuts on a corresponding shoulder of the intermediate sleeve 20. A rear locking nut 41 is screwed to the sleeve 20 to lock the cable guide in the sleeve by support of these two shoulders. The nut 41 is axially recessed and it also encloses a ring 42 for supporting the cable.

To provide for passage of the synthetic material coming out of the slits 17 of the distribution channels, the intermediate sleeve 20 is provided with a peripheral groove 44 and with four cross-channels 45 disposed symmetrically in a radial plane and separated by tie pieces 46. Facing these channels, the cable guide 31 also comprises a peripheral groove 47, from which the synthetic material may flow around the mandrel rod 37 up to the die.

It has been found that, to ensure smooth flow of the synthetic material through the cross-channels 45, it is advantageous to provide the tie pieces 46 with a bevelled profile, according to the cross-sectional view in FIG. 3, so that their faces form, with a peripheral surface of the mandrel rod, acute angles A which may preferably lie between 10° and 45°.

In the course of extrusion, the cable 2 passes by along the axis of rotation 50 through the driving mechanism 21, the cable guide 31 and the die 30, at a speed which corresponds to the speed of extrusion of the synthetic material in the die. The synthetic material delivered under pressure by the extruder is distributed all around the mandrel rod 37 by the channels described above and it flows through the axial orifice 31 of the rotary die, which shapes it helicoidally. As all of the elements of the extruder head are metallic, the heat delivered by the heating elements 12 is distributed by conduction throughout the entire head, whereby to mainntain the synthetic material at a proper temperature up to the die.

The problem of tightness between the fixed and rotating parts simply consists in preventing too much leakage of synthetic material along the surfaces of mutual contact of the distributing cartridge 14 and the intermediate sleeve 20. In fact, one allows for the existence of a slight leakage flow of synthetic material along these sliding surfaces, which advantageously ensures their lubrication. This leakage flow is controlled by adjusting the clamping of the intermediate sleeve 20 on the cartridge 40 by means of the adjusting nut 25, in such a manner that the synthetic material, maintained at high temperature by heating, seeps through slowly at the two extremities of the cartridge 14. The nut 25 is then locked by its counternut 26. In fact, the leakage flow may be very slight, limited to a few grams per hour.

It is remarked that, due to the fact that the die 30 and the cable guide 31 are both fixed within the sleeve 20, the axial thrust thrusts exerted upon them by the synthetic material are absorbed by the sleeve 20 via the nuts 34 and 41 and that there is thus no notable axial resultant on the outer sliding surfaces of the sleeve.

It is remarked that the extruder head described above has a very simple structure and reliable operation. Most of the parts are similar to those of heads with a fixed die. The intermediate sleeve essentially has cylindrical surfaces, which may be readily machined. Further, dismantling the head for cleaning or replacing the die and the cable guide does not present any difficulty. As there are no ball or roller bearings, the transmission of heat is readily effected by conduction and it is hence not necessary to provide heating means near to the die. In addition, fouling of the bearings is thus avoided.

The present invention is not limited to the embodiment described above as an example, but it extends to any modification or variant obvious to one skilled in the art. It particularly permits making extruder heads with a rotary die adapted to produce all sorts of elements of synthetic material having a helicoidal profile on their outer surface or on an inner surface by means of a mandrel rod which extends through the axial orifice of the die and which itself comprises ribs. It is understood that the helix pitch may be controlled by adjusting the speed of rotation with respect of the axial speed of extrusion. By utilizing a die provided with straight and short ribs and by alternately changing the direction of rotation by the driving mechanism 21, one may fabricate a rod for optical fibers which is similar to that in FIG. 1, but presents an alternating helicoidal pitch whose direction changes regularly, for example, after 270° of rotation in each direction. Such rods allow for compensation of the tension in the fibers at the moment they are laid on to the rod.

The present invention is also applicable to a head for extruding a two-tone element such as an insulating sheath for an electrical conductor having one or more bands of synthetic material of a second color on a material of a first color. In that case, the extruder head is completed by a second feed coming from an auxiliary extruder, in the manner known in particular from the EP-A-No. 0078213 mentioned above. The rotary die which is utilized then comprises a supplementary channel 51 represented schematically in dashed lines in FIG. 2, this channel being fed through the distributing cartridge 14 and the intermediate sleeve 20 by distribution channels similar to the channels 16, 17 44 and 45 utilized for the first color.

We claim:

1. An extruder head for fabricating a helicoidal element of thermoplastic synthetic material, comprising:
   a body having an axial bore and a feed channel for a flow of pressurized synthetic material from an extruder to said axial bore,
   a distributing cartridge fixedly mounted within said axial bore and provided with a first axial cylindrical bore and with distribution channels for distributing said synthetic material around said first cylindrical bore,
   rotary die means slidably mounted in said first cylindrical bore and having an axial output orifice, the form of which corresponds to the cross section of the element to be fabricated, and through which said synthetic material is extruded and shaped helicoidally, and channel means for said synthetic material flow between the periphery of said first cylindrical bore and said output orifice,
   and a rotary driving mechanism coupled to said rotary die means, wherein said rotary die means includes an intermediate rotary sleeve, a rotary die and a rotary mandrel rod, said sleeve having an axial central bore and an outer cylindrical surface slidably rotating in said first cylindrical bore of the distributing cartridge, wherein said rotary die is provided with said output orifice and said rotary mandrel rod is provided aligned with and spaced axially from said rotary die, said rotary die and said rotary mandrel rod being fixed in said central bore of said intermediate rotary sleeve, said sleeve being provided with a peripheral shoulder slidably applied on one end of said distributing cartridge, and wherein an adjusting nut is engaged on a threaded outer portion of said sleeve for exerting an adjustable axial force on the other end of said cartridge, whereby a leakage flow of said synthetic materials is permitted along said outer cylindrical surface of said sleeve for lubricating said surface, said leakage flow being controlled by axial clamping of said cartridge between said shoulder and said adjusting nut, said shoulder and said nut being slidably applied to said ends of said cartridge.

2. Extruder head according to claim 1, wherein said distribution channel of said cartridge includes two symmetrical lobes each extending over 180° around said intermediate sleeve, said intermediate sleeve includes a peripheral groove, facing said distribution channels of said cartridge, which communicates with the interior of said sleeve through cross-channels for passage of said synthetic material, said cross-channels being separate from each other by tie pieces having faces situated facing said mandrel rod which form, in transverse cross section acute angles with the peripheral surface of said mandrel rod, and wherein said mandrel rod includes a peripheral groove facing said cross-channels.

3. Extruder head according to claim 1, wherein said rotary driving mechanism is disposed facing the rear extremity of said intermediate sleeve on the side opposed to the exit of the extruded product, and includes radial pins which are engaged in notches provided in the rear extremity of said sleeve.

4. Extruder head according to claim 1, wherein said mandrel rod includes an outer cylindrical surface for centering in said intermediate sleeve and a circular abutment shoulder cooperating with a corresponding shoulder of said intermediate sleeve, and wherein a rear locking nut is mounted in a threaded portion of said intermediate sleeve in an extension of said mandrel rod extremity which is opposed to said die, whereby to lock said mandrel rod axially and in rotation by clamping of said shoulder.

5. Extruder head according to claim 1, wherein said die is slidably mounted in said intermediate sleeve in an axial position which is adjustable by means of an abutment nut screwed on a threaded portion of said intermediate sleeve.

6. Extruder head according to claim 5, wherein said die includes an outer cylindrical surface, and a rotary driving pin engaged in a corresponding longitudinal groove of said intermediate sleeve.

7. An extruder head for fabricating an element of synthetic material of a first color having at least one helicoidal band of synthetic material of a second color, said head comprising:
   a body having an axial bore, a first feed channel for a first flow of pressurized synthetic material of the first color from a main extruder to said axial bore, and a second feed channel for a second flow of pressurized synthetic material of a second color from an auxiliary extruder to said axial bore,
   a distributing cartridge fixedly mounted within said axial bore and provided with a first axial cylindrical bore and with distribution channels for distributing said synthetic materials around said first cylindrical bore,
   rotary die means slidably mounted in said first cylindrical bore and having an axial output orifice, the form of which corresponds to the cross section of the element to be fabricated, and through which said synthetic material of a first color and said synthetic material of a second color are extruded and shaped helicoidally, and channel means for said synthetic material flows between the periphery of said first cylindrical bore and said output orifice, and a rotary driving mechanism coupled to said rotary die means, wherein said rotary die means includes intermediate rotary sleeve, a rotary die and a rotary mandrel rod, said sleeve having an axial central bore and an outer cylindrical surface slidably rotating in said first cylindrical bore of the distributing cartridge, wherein said rotary die is provided with said output orifice and said rotary mandrel rod is provided aligned with and spaced axially from said rotary die, said rotary die and said rotary mandrel rod being fixed in said central bore of said intermediate rotary sleeve, said sleeve being provided with a peripheral shoulder slidably applied on one end of said distributing cartridge, and wherein an adjusting nut is engaged on a threaded outer portion of said sleeve for exerting an adjustable axial force on the other end of said cartridge, whereby a leakage flow of said synthetic materials is permitted along said outer cylindrical surface of said sleeve for lubricating said surface, said leakage flow being controlled by axial clamping of said cartridge between said shoulder and said adjusting nut, said shoulder and said nut being slidably applied to said ends of said cartridge.

* * * * *